United States Patent [19]

Pruszenski, Jr.

[11] Patent Number: 4,899,954
[45] Date of Patent: Feb. 13, 1990

[54] GROUND-AIR-WATER CRAFT

[76] Inventor: Anthony Pruszenski, Jr., No. 3, 44th St., Plum Island, Mass. 01951

[21] Appl. No.: 192,544

[22] Filed: May 11, 1988

[51] Int. Cl.$^4$ .................. B64C 37/00; B64C 39/08; B64C 39/12
[52] U.S. Cl. .................................. 244/2; 244/45 R; 244/45 A; 244/50; 244/91
[58] Field of Search ............. 244/2, 36, 45 R, 45 A, 244/50, 91

[56] References Cited

U.S. PATENT DOCUMENTS

| | | | |
|---|---|---|---|
| 1,714,170 | 5/1929 | Jette | 244/50 |
| 2,713,465 | 7/1955 | Novinger | 244/2 |
| 2,814,482 | 11/1957 | Anderson et al. | 244/50 |
| 3,034,748 | 5/1962 | Koup | 244/50 |
| 3,371,886 | 3/1968 | Schertz | 244/2 |
| 3,834,654 | 9/1974 | Miranda | 244/91 |
| 4,579,297 | 4/1986 | Ayoola | 244/2 |

FOREIGN PATENT DOCUMENTS 0084686  8/1983  European Pat. Off. .......... 244/45 A
1039983 10/1953  France .

OTHER PUBLICATIONS

NASA Technical Memorandum 75872, "The High Lift Characteristics in the Case of the V-Wing Concept"-Z. Zimmer (Nov. 1980).

Primary Examiner—Sherman D. Basinger
Assistant Examiner—Rodney Corl
Attorney, Agent, or Firm—Felfe & Lynch

[57] ABSTRACT

A ground-air-water craft comprises a fuselage body with a passenger compartment mounted thereon, a box-type main wing connected to the fuselage and extending outwardly on both sides thereof, the main wing comprising an upper wing and a lower wing which are substantially horizontal and which have a total wing span in the range of 5 to 10 feet, as well as a right side member and a left side member, each side member extending substantially vertically and connected between the lateral ends of the upper and lower wings on the respective right and left sides of the craft. The craft also comprises a control or canard wing connected to the fuselage and extending outwardly on both sides of the fuselage with a wing span no greater than 10 feet. The craft also comprises front and rear wheels with balance wheels mounted therebetween, air propelling means which may constitute a propeller or a jet engine mounted on the craft, water propelling means driven by a hydraulic or electric drive motor, and fuel tanks mounted in the upper wing. The control wing is pivotable about its longitudinal axis, and all of the wings have moveable control surfaces comprising flap means for controlling the lift as well as air spoiler means disposed on the upper surfaces thereof. The front and rear wheels may be retractable and the body portion of the fuselage is water tight and includes a hydroplane bottom surface for a reduced resistance to water.

44 Claims, 3 Drawing Sheets

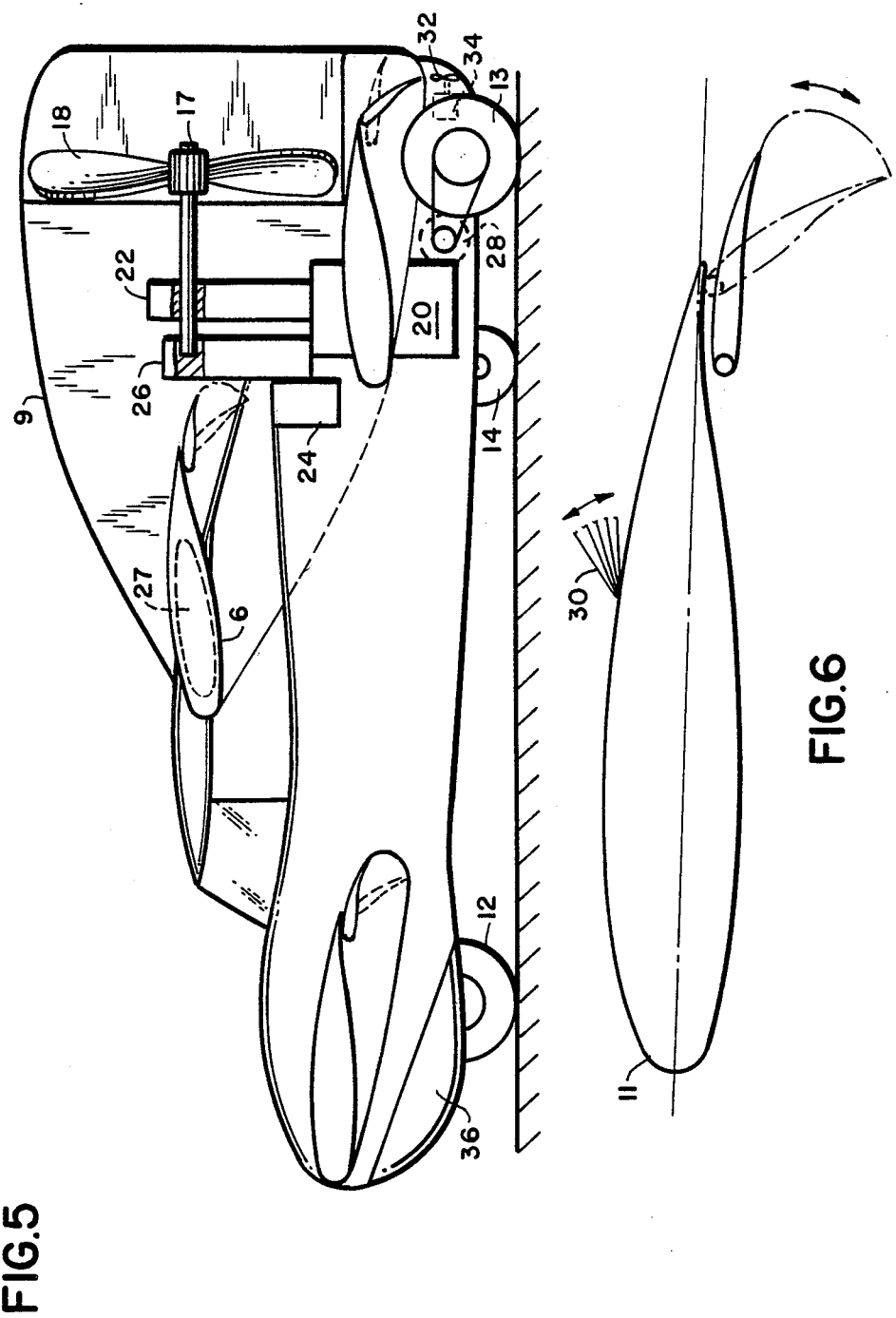

GROUND-AIR-WATER CRAFT

BACKGROUND OF THE INVENTION
1. Field of the Invention

The invention relates to an air-land-sea vehicle having a box wing configuration.

2. Description of the Prior Art

The NASA Technical Memorandum TM-75872 titled "The High Lift Characteristics in the Case of the V-Wing Concept" written by H. Zimmer and published in Nov. 1980 discloses in FIG. 3 (substantially reproduced herein as prior art FIG. 1) several curves illustrating the ratio of induced drag for various configurations with the same lift and the same wing span. As shown therein, curve d, which is representative of a box wing configuration, has the least ratio of induced drag of any of the wing configurations shown in the figure.

Among other prior art references of some relevance to the present invention are the following:

U.S. Pat. No. 1,058,983 discloses a flying machine having a biplane configuration with movable canards.

U.S. Pat. No. 1,839,194 shows a canard-type airplane having a single main wing.

U.S. Pat. No. 2,553,952 shows a combined land vehicle and airplane having a demountable single main wing and conventional tail surfaces.

U.S. Pat. No. 3,371,886 teaches an aircraft adapted for highway usage having a single main wing and canard wing units.

U.S. Pat. No. 4,627,585 discloses a combination road vehicle and aircraft having a foldable main wing and a pusher-type propeller mounted behind the center of the fuselage to the rear of the main wing.

U.S. Pat. No. 3,960,103 shows a marine skimmer craft (not an airplane) with two main wings and a canard. The main wings are attachable in panels to provide the desired lift.

Other prior art references considered to be of lesser interest with respect to the present invention include the following:

U.S. Pat. No. 1,495,031 describes an airplane having a plurality of wings configured for improved lifting capability.

U.S. Pat. No. 1,523,386 describes an airplane having a biplane wing configuration, and small wings on opposite sides of the engine to provide added lift to the engine during landing.

U.S. Pat. No. 1,705,904 describes an airplane having a multi-wing configuration to increase or reduce the lift in accordance with the load.

U.S. Pat. No. 2,681,773 describes a roadable aircraft with folding wings.

U.S. Pat. No. 3,258,228 describes an aircraft with a separate flight unit and payload unit coupled together.

U.S. Pat. No. 2,147,968 describes an acrobatic aircraft having a wing configuration which provides a minimum gliding ratio as well as buoyancy.

U.S. Pat. No. 3,931,942 is of interest relative to the invention of the present application in its description of an aircraft convertible to an automobile wherein the transition from the ground effect mode to the flight mode is made in flight by simultaneously lowering the tandem of the air foils, lifting the rear wall and altering the angle of attack of the forward air foil.

U.S. Pat. No. 3,954,231 is of some relevance to the invention of the present application in showing a arrangement for lifting, stabilizing, and flight controlling wing surfaces placed near the front of an aircraft with the main lifting wing surfaces placed toward the rear.

U.S. Pat. No. 3,134,560 discloses an aircraft convertible to a ground vehicle with foldable outer wing sections.

French Pat. No. 1,039,983 describes a combination automobile and a detachable airplane with a single wing.

SUMMARY OF THE INVENTION

Among the primary objects of the present invention are to provide a ground-air-water craft which, when operating in the flight mode, provides for landing as slowly as possible and climbing as steeply as possible. Landing slowly is a desirable feature because it minimizes the kinetic energy of the vehicle and thus allows the vehicle to make turns of the smallest possible radius. Steep climbs are desirable because they allow for the maximum obstacle clearance and thus increase the margin of safety and also the number of locations available for take-off.

Another primary object of the present invention is to provide a ground-air-water craft which may be conveniently converted from air to ground, or from air to water, service without folding, dismantling or otherwise changing any of the craft's wing structures.

The ground-air-water craft of the present invention incorporates a box wing/canard aircraft configuration with a total wing span of less than 10 feet; propulsion means comprising a pusher configuration with a clutched propeller, turboprop or turbine; landing and ground running gear of conventional, bicycle or tricycle configuration; and means for hydroplane water operation.

The box wing configuration of the ground-air-water craft increases the effective aspect ratio of any given wing and, as a result, increases the maximum lift coefficient and thus the maximum lift to drag ratio. The lift coefficient determines the slowest landing speed for the plane. A maximized coefficient minimizes the landing speed. Since the lift to drag coefficient determines the maximum angle of climb for a given horsepower and weight, maximization of the lift to drag coefficient results in maximization of the angle of climb. In the inventive craft of the present invention, the propeller is positioned over the rear lifting wing of the box configuration. This positioning of the propeller provides several advantages. First, it provides an enhancement of lift due to a channel wing effect. Also, it provides some protection to the propeller from erosion due to water or particles. An additional advantage which is that provides containment of the propeller and drive train to limit accidental access and fragmentation damage.

The vehicle of the present invention is designed to work effectively in all three of its operating media, i.e. on the ground, in the air and on the water. The propeller is used primarily to provide thrust for air operations. It is designed to be declutched when the craft is stationary or on the ground so as to eliminate the safety hazard of rotating blades. The clutching feature eliminates the need for a cage around the propeller and thus decreases the vehicle's resistance and weight, therefore increasing the climb angle.

At high speeds the air resistance of a vehicle is the predominant source of energy drain but below approximately 30 miles per hour air resistance becomes relatively insignificant and rolling (ground) and wave (water) friction and resistance are the major forces which must be overcome by the power plant. When the vehicle is operating at below 30 miles per hour in an automobile or boat modes, the propeller is declutched and the vehicle is powered directly through its wheels or a water propelling device, respectively. When operating above 30 miles per hour the air propeller may be engaged.

For a full understanding of the present invention, reference should now be made to the following detailed description of the preferred embodiments of the invention and to the accompanying drawings.

BRIEF DESCRIPTION OF THE DRAWINGS

FIG. 5 is a partly sectional elevational view of the ground-air-water craft of FIG. 2.

FIG. 6 is an elevational view of the control or canard wing for the craft.

DETAILED DESCRIPTION OF THE INVENTION

As mentioned previously, FIG. 1 shows a series of experimentally-determined curves which illustrate that a box wing configuration has a lower ratio of induced drag than other wing configurations.

Figure 2:
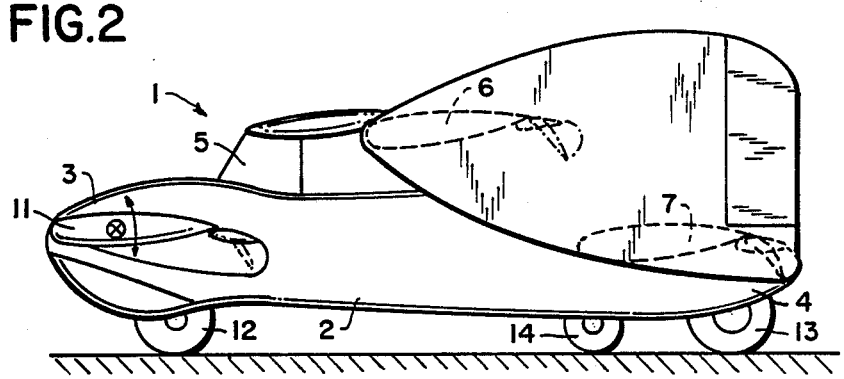
FIG. 2 is a side elevational view of the ground-air-water craft of the present invention.
Figure 3:
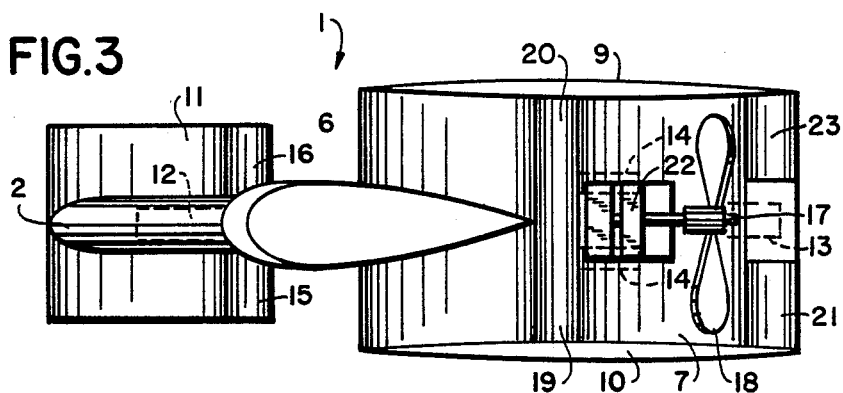
FIG. 3 is a top view of the ground-air-water-craft shown in FIG. 2.

As shown in FIG. 2, the ground-air-water-craft 1 of the present invention comprises a fuselage body 2 having a front end 3, a rear end 4 and a passenger compartment 5 therebetween. A box type main wing connected to the fuselage and extending outwardly therefrom comprises an upper wing 6 and a lower wing 7 which are substantially horizontal and have substantially the same wing span, between opposite lateral ends, which is in the range of 5 to 10 feet. The box type main wing also comprises, as shown in FIGS. 2 and 3, a right side member 9 and a left side member 10, with each side member extending substantially vertically and connected between the lateral ends of the upper and lower wings on the respective right and left sides of the craft.

Figure 1:
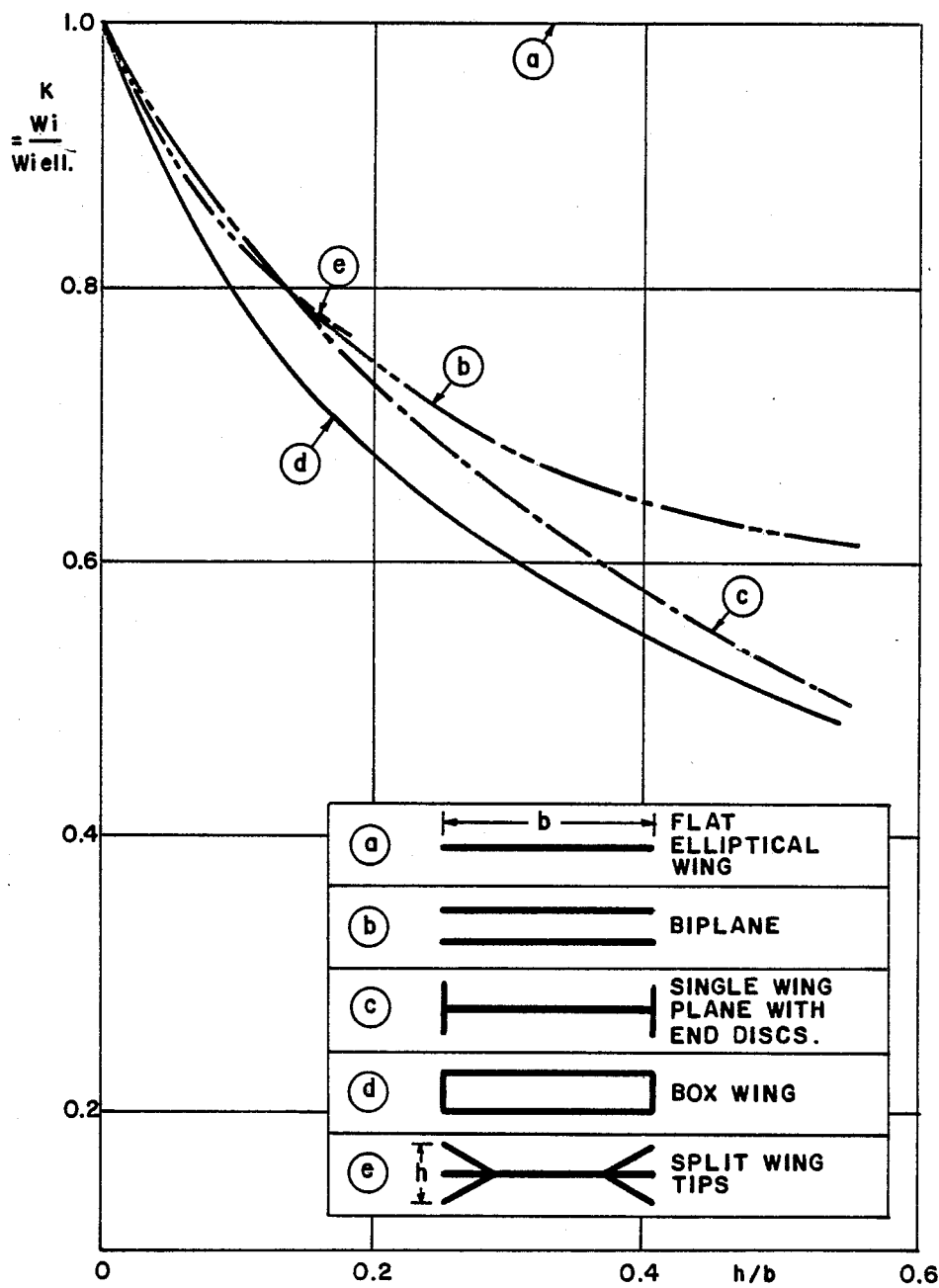
FIG. 1 comprises curves from a prior art reference showing the ratio of induced drag for various wing configurations.

Also, as shown in FIGS. 1 and 2, a control or canard wing 11 is connected to the fuselage and extends outwardly, on both sides of the fuselage 2, approximately equal distances. The total wing span between opposite lateral ends of the control or canard wing is less than 10 feet. The control wing and the main wing are located, with respect to each other, such that their centers of lift are on opposite sides of the center of gravity of the ground-air-water-craft in the central, longitudinal, vertical plane between the front and rear ends of the fuselage 2. Also as shown in FIGS. 1 and 2, the ground-air-water-craft 1 comprises a front wheel 12, a rear wheel 13, and a pair of balance wheels 14 symmetrically situated around the longitudinal center of the craft.

Figure 4:
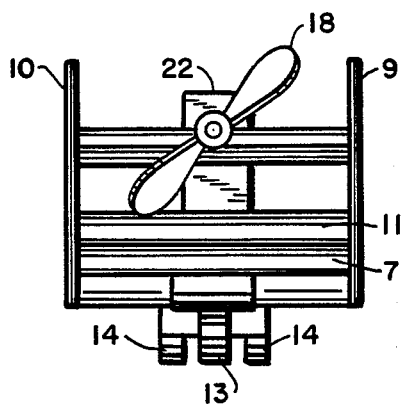
FIG. 4 is a elevation view of the ground-air-water-craft shown in FIG. 2.

FIG. 2 also illustrates a propeller which, as shown in FIG. 4, comprises a hub 17 as well as blades 18. The propeller is powered by an engine 20 (FIG. 5), which may be a piston, Wankel or turbine engine, through the intermediary of a coupling/decoupling device 22.

As an alternative to the propeller, a single jet engine may be mounted above the center wing or on either side of the passenger compartment below the center wing.

With respect to the aforementioned main engine 20, it is noted that the passengers located in the passenger compartment 5 and the main engine 20 both have respective centers of gravity of their own which are respectively located on opposite sides of the center of gravity of the ground-air-water craft. Alternatively, the passengers may be located at or near the center of gravity of the craft.

With respect to FIG. 5 an electric generator or hydraulic pump 24 is mechanically coupled to the main engine 20 through the intermediary of a second coupling/decoupling device 26. One or more electric or hydraulic drive motors 28 are mechanically coupled to drive one or more wheels.

As shown in FIG. 5, at least one fuel tank 27 is mounted on the upper wing 6.

As best shown in FIG. 2, the control or canard wing 11 may be pivotable about its longitudinal axis with the respective right side and left side of the control wing 11 being pivotable together to control the pitch of the craft 1 and pivotable in opposite directions to control the roll of the craft 1. Also, or in the alternative, the control wing 3 may have moveable control surfaces 15 and 16 disposed on its trailing edges on both sides of the fuselage 2. As shown in FIG. 3, moveable control surfaces 19 and 20 are disposed on the trailing edges of the upper main wing 6 and control surfaces 21 and 23 are disposed on the trailing edges of the lower main wing 7, on both sides of the fuselage 2. The aforementioned control surfaces 15, 16, 19 20, 21 and 23 are flaps for controlling the lift of each of the wings.

As shown in FIG. 6, air spoiler means 30 are disposed on the upper surfaces of the control wing 11. Such air spoiler means may also be disposed on the upper surfaces of each of the main wings on both sides of the fuselage 2. The air spoiler means are located approximately at the 0.3 chord point, as viewed from the trailing edge of the wing, the chord being an imaginary line drawn from the leading edge to the trailing edge of the wing.

It is noted that the air propelling means shown in FIGS. 2 and 3 are mounted to the rear of the center of gravity of the craft 1 as are water propelling means 32 shown in FIG. 5.

Another feature of the invention is that at least one of the front wheel 12, rear wheel 13 and side wheels 14 can be retractable.

One of the wheel configurations contemplated by the invention includes two front wheels 12 mounted laterally on opposite sides of the central, longitudinal, vertical plane of the craft 1 with a single rear wheel 13 disposed in the longitudinal plane of the craft 1. It is also contemplated that the rear wheel 13 is steerable in this configuration.

As shown in FIGS. 2 and 5, the bottom portion of the fuselage 2 can be made watertight and includes a hydroplane bottom surface 36 which affords a reduced resistance to water when the craft is propelled across a water surface. Also with regard to the use of the craft in the water, as is shown in FIG. 5 water propelling means 32 are connected to a separate electric or hydraulic drive motor 34, which is powered by the electric generator or hydraulic pump 24. The water propelling means may be a conventional water propeller, a water jet, or some other known device for propelling the craft on the water.

There has thus been shown and described a novel ground-air-water craft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications variations and other uses and applications which do not depart from the spirit and scope of the invention are deemed to be covered by the invention which is limited only by the claims which follow.

What is claimed is:

1. A land, air and water ("LAW") craft having a center of gravity and comprising, in combination:
   (a) a fuselage having a front end, a rear end, and a passenger compartment therebetween, said fuselage defining a central, longitudinal and vertical plane between said front and rear ends;
   (b) a box-type, main wing connected to said fuselage and extending outwardly, on both sides of said fuselage, approximately equal distances from said longitudinal plane, said main wing including
      (i) an upper main wing and a lower main wing which are substantially horizontal and have substantially the same wingspan, between opposite lateral ends, said lower main wing extending from a leading edge, which is rearward of the driver's position in said passenger compartment, to a trailing edge which substantially coincides, in longitudinal position, with said rear end of said fuselage, said upper main wing having a leading edge which is forward of said leading edge of said lower main wing; and
      (ii) a right side member and a left side member, each side member extending substantially vertically and connected between said lateral ends of said upper and lower main wings on a respective right and left side of said craft;
   (c) a control wing connected to said fuselage and extending outwardly, on both sides of said fuselage, approximately equal distances from said longitudinal plane, said control wing and said main wing being located, with respect to each other, such that their centers of lift are on opposite sides of said center of gravity as viewed in the direction of said longitudinal plane;
   (d) front wheel means mounted on said craft forward of said center of gravity;
   (e) rear wheel means mounted on said craft to the rear of said center of gravity and beneath said lower main wing at such longitudinal position that it prevents said lower main wing from contacting the ground when said craft is flying at an extreme upward pitch;
   (f) prime mover means mounted on said craft;
   (g) air propelling means mounted on said craft between said two side members and above said lower main wing; and
   (h) first coupling means for selectively coupling said prime mover means to:
      (i) at least one of said wheel means, and
      (ii) said air propelling means.

2. The LAW craft defined in claim 1, wherein passengers located in said passenger compartment and said prime mover means both have respective centers of gravity of their own, and wherein said centers of gravity of said passengers, on one hand, and said prime mover means, on the other, are located on opposite sides of said center of gravity of said craft as viewed in the direction of said longitudinal plane.

3. The LAW craft defined in claim 2, wherein said center of gravity of said prime mover means is located to the rear of said center of gravity of said craft.

4. The LAW craft defined in claim 1, wherein the centers of lift of said control wing and said main wing are located, respectively, in front of, and to the rear of said center of gravity of said craft.

5. The LAW craft defined in claim 1, wherein said first coupling means include hydraulic pump means mechanically coupled to said prime mover means and hydraulic drive motor means, hydraulically coupled to said hydraulic pump means and mechanically coupled to at least one of said wheel means, for driving said at least one wheel means.

6. The LAW craft defined in claim 5, wherein said hydraulic drive motor means include a separate hydraulic drive motor disposed adjacent, and mechanically coupled to each of said front wheel means and said rear wheel means.

7. The LAW craft defined in claim 5, wherein said hydraulic drive motor means include a separate hydraulic drive motor disposed adjacent, and mechanically coupled to each individual wheel of said at least one wheel means.

8. The LAW craft defined in claim 1, wherein said first coupling means include electric generator means, mechanically coupled to said prime mover means, and electric drive motor means, electrically coupled to said electric generator means and mechanically coupled to at least one of said wheel means, for driving said at least one wheel means.

9. The LAW craft defined in claim 8, wherein said electric drive motor means include a separate electric drive motor disposed adjacent, and mechanically coupled to each of said front wheel means and said rear wheel means.

10. The LAW craft defined in claim 8, wherein said electric drive motor means include a separate electric drive motor disposed adjacent, and mechanically coupled to each individual wheel of said at least one wheel means.

11. The LAW craft defined in claim 1, further comprising at least one fuel tank located in said upper wing.

12. The LAW craft defined in claim 1, wherein said control wing is pivotable about its longitudinal axis, the right and left sides of said control wing being pivotable together to control the pitch of said craft, and pivotable in opposite directions to control the roll of said craft.

13. The LAW craft defined in claim 1, further comprising movable control surfaces disposed on the trailing edges of said control wing on both sides of said fuselage.

14. The LAW craft defined in claim 1, further comprising movable control surfaces disposed on the trailing edges of at least one of said upper main wing and said lower main wing on both sides of said fuselage.

15. The LAW craft defined in claim 14, wherein said control surfaces include flap means for controlling the lift of said at least one upper main wing and lower main wing.

16. The LAW craft defined in claim 1, further comprising movable control surfaces disposed on the trailing edges of each of said wings on both sides of said fuselage.

17. The LAW craft defined in claim 16, wherein said control surfaces include flap means for controlling the lift of each of said wings.

18. The LAW craft defined in claim 1, further comprising movable air spoiler means disposed on the upper surface of said control wing on both sides of said fuselage.

19. The LAW craft defined in claim 1, further comprising movable air spoiler means disposed on the upper surface of at least one of said upper main wing and said lower main wing on both sides of said fuselage.

20. The LAW craft defined in claim 1, further comprising movable air spoiler means disposed on the upper surface of each of said wings on both sides of said fuselage.

21. The LAW craft defined in claim 18, wherein said air spoiler means are located at approximately the 0.3 chord point, as viewed from the trailing edge of said control wing, said chord being an imaginary line drawn from the leading edge to the trailing edge of said control wing.

22. The LAW craft defined in claim 19, wherein said air spoiler means are located at approximately the 0.3 chord point, as viewed from the trailing edge of said at least one upper main wing and lower main wing, said chord being an imaginary line drawn from the leading edge to the trailing edge of the respective wing.

23. The LAW craft defined in claim 4, wherein said air propelling means are mounted to the rear of said center of gravity.

24. The LAW craft defined in claim 1, wherein at least one of said front wheel and rear wheel means are retractable.

25. The LAW craft defined in claim 1, wherein said front wheel means include two front wheels spaced laterally on opposite sides of said longitudinal plane and wherein said rear wheel means include a single rear wheel disposed in said longitudinal plane.

26. The LAW craft defined in claim 25, wherein said rear wheel means is steerable.

27. The LAW craft defined in claim 1, wherein at least the bottom portion of said fuselage is watertight and includes a hydroplane bottom surface which affords a reduced resistance to water when said craft is propelled across a water surface.

28. The LAW craft defined in claim 27, further comprising water propelling means mounted on said craft for driving said craft forward when said fuselage is resting on a water surface and second coupling means for selectively coupling said prime mover means to said water propelling means.

29. The LAW craft defined in claim 28, wherein said second coupling means includes a hydraulic pump means, mechanically coupled to said prime mover means, and hydraulic drive motor means, hydraulically coupled to said hydraulic pump means and mechanically coupled to said water propelling means.

30. The LAW craft defined in claim 28, wherein said second coupling means include electric pump means, mechanically coupled to said prime mover means, and electric drive motor means, electrically coupled to said electric pump means and mechanically coupled to said water propelling means.

31. The LAW craft defined in claim 1, wherein said front wheel means and said rear wheel means each include a single road wheel, and wherein said craft further comprises balancing wheel means mounted on said craft substantially laterally in line with or to the rear of said center of gravity, said balancing wheel means including two road wheels disposed on opposite sides of said longitudinal plane.

32. The LAW craft defined in claim 1, wherein both said upper and lower main wings are mounted on said fuselage.

33. The LAW craft defined in claim 32, wherein the trailing edge of said upper main wing substantially coincides, in longitudinal position, to the leading edge of said lower main wing.

34. The LAW craft defined in claim 33, wherein said air propelling means has a central longitudinal axis which is oriented substantially in the plane of said upper main wing.

35. The LAW craft defined in claim 34, wherein said air propelling means is disposed rearward of said upper main wing.

36. The LAW craft defined in claim 1, wherein said first coupling means couples said prime mover means to said rear wheel means and to said air propelling means.

37. The LAW craft defined in claim 1, wherein said right side member and said left side member each have a downward and rearward sloping front edge, to provide a streamlined surface for impinging air and water.

38. The LAW craft defined in claim 37, wherein said leading edge of each right side member and left side member extends downwardly from a forwardmost point, which is at least as far forward as the leading edge of said upper main wing, to a lower, more rearward point, which is at least as far forward as the leading edge of said lower main wing.

39. The LAW craft defined in claim 1, wherein said right side member and said left side member each extend above the upper surface of said upper main wing.

40. The LAW craft defined in claim 1, wherein said right side member and said left side member each extend below the lower surface of said lower main wing.

41. The LAW craft defined in claim 1, wherein said right side member and said left side member each have a trailing edge which is articulated to serve as a rudder.

42. The LAW craft defined in claim 41, wherein said articulated trailing edges of said right side member and said left side member are located rearward of said air propelling means.

43. The LAW craft defined in claim 1, wherein said fuselage has a length, between said front end and said rear end, which is less than approximately 25 feet; wherein said upper main wing and said lower main wing each have a wingspan which is less than approximately 10 feet; and wherein said control wing has a wingspan which is less than approximately 10 feet.

44. The LAW craft defined in claim 43, wherein said fuselage length is in the range of 10 to 25 feet; and wherein said upper main wing and said lower main wing each have a wingspan in the range of 5 to 10 feet.

* * * * *